US006418126B1

(12) United States Patent
Gilmurray et al.

(10) Patent No.: US 6,418,126 B1
(45) Date of Patent: Jul. 9, 2002

(54) WIRELESS ATM NETWORKS

(75) Inventors: Damian Peter Gilmurray, Cambridge; David William Pegler, Bedfordshire; John David Porter, Cambridge, all of (GB)

(73) Assignee: Adaptive Broadband Ltd., Cambridge (GB)

( * ) Notice: Subject to any disclaimer, the term of this patent is extended or adjusted under 35 U.S.C. 154(b) by 0 days.

(21) Appl. No.: 09/110,948

(22) Filed: Jul. 7, 1998

(51) Int. Cl.$^7$ .............................. H04B 7/00; H04L 12/56
(52) U.S. Cl. ................... 370/310.1; 370/395.2
(58) Field of Search .................. 370/328, 338, 370/392, 395, 396, 398, 399, 230, 236, 401, 410, 467, 466, 252, 437, 487, 522, 395.2, 310.1, 395.5

(56) References Cited

U.S. PATENT DOCUMENTS

| | | | | |
|---|---|---|---|---|
| 5,638,371 A | * | 6/1997 | Raychaudhuri et al. | 370/347 |
| 5,787,077 A | * | 7/1998 | Kuehnel et al. | 370/331 |
| 5,912,885 A | * | 6/1999 | Mitts et al. | 370/331 |
| 5,991,639 A | * | 11/1999 | Rautiola et al. | 455/553 |
| 6,111,858 A | * | 8/2000 | Greaves et al. | 370/256 |
| 6,128,305 A | * | 10/2000 | Hjalmtysson et al. | 370/410 |

* cited by examiner

Primary Examiner—Alpus H. Hsu
Assistant Examiner—Duc Ho
(74) Attorney, Agent, or Firm—Banner & Witcoff, Ltd.

(57) ABSTRACT

A method of setting up a connection between two parties over a radio ATM network is provided. A remote, off-board agent, called the proxy signalling agent, is used to provide signalling and call control functionality for one or more network element(s). In order to receive and transmit signalling messages on behalf of the network element, a bi-directional virtual channel is provisioned, one for each port, from the network element to the proxy signalling agent. For each network element under the control of the proxy signalling agent, the proxy signalling agent provides signalling stacks, one for each of the elements ports, along with call admission control, routing and VCI allocation functions. This avoids the need for the network element to perform these functions. The proxy signalling agent controls the network element's connection tables using a simple and low-level control protocol to effect changes in the connection state at that element, rather than using UNI. As the network element does not need to provide signalling stacks, it can be a low cost, low complexity device. By making these devices as simple as possible, the overall reliability of the network can be increased.

7 Claims, 5 Drawing Sheets

WIRELESS ATM NETWORKS

The invention relates to wireless ATM networks, and in particular to a remote or proxy signalling technique for the support of wireless and mobile broadband devices.

The invention has been developed in the context of a wireless broadband Asynchronous Transfer Mode (ATM) networking infrastructure which is capable of supporting multi-media data traffic at high bit rates in local and wide areas.

ATM is a packet switching and multiplexing technology using data packets of a fixed length called cells. It is designed to be a general purpose, connection-oriented, cell relay network supporting a wide range of guaranteed and best-effort Qualities of Service (QoS). ATM is a flexible and scalable technology which can operate at many bit rates over a number of physical media including Category 5 UTP and multimode fibre. The same protocols are used in both the local and wide-area enabling global end-to-end ATM interoperability.

Each cell has a short header containing a label, the Connection Identifier (CI), which identifies the payload as belonging to a particular connection or cell. This is composed of a Virtual Path Identifier (VPI) and a Virtual Circuit Identifier (VCI) and is used by each switching node to route the cell from the Input Port to the appropriate output port. The VPI:VCI is only a local identifier between two network elements and as such is changed as the cell traverses a switch.

In ATM networks, signalling is the means by which a connection is created (and deleted) between two endpoints, termed the Calling Party and the Called Party. Signalling takes place between network elements over a dedicated connection with a well-known VPI:VCI 0:5 as defined in the ATM Forum User-to-Network (UNI) and Network-to-Network (NNI) signalling standards.

These signalling protocols are defined in:

ATM User-Network Interface Specification, version 3.1, September 1994;

ATM User-Network Interface (UNI) Signalling Specification, Version 4.0, June 1996;

ATM Private Network-Network Interface Specification Version 1.0 (PNN1 1.0), March 1996; and

ITU-T Q.2931.

In conventional ATM signalling, signalling control messages proceed through the network in a hop-by-hop manner, following the same path as the connection which they reference. As such each network element is required to run full signalling stacks for each of its ports and provide full call control functionality.

Because signalling messages are important control messages used to maintain the connection state in the network, it is necessary to ensure their correct delivery between network nodes. In order to achieve this, signalling messages are carried over a reliable transport protocol called SSCOP. This protocol establishes connectivity between two signalling entities and ensures that messages are delivered reliably and in order between signalling peers.

Referring to FIGS. 1 and 2, in a wired ATM network, a first host 10, wishing to communicate with another host 12 sends a SETUP signalling message over its UNI on VPI:VCI 0:5 to the first network element in the connection path, the ingress switch 16. The switch 16 performs call admission control to decide whether the resources required for the requested connection can be allocated without violating the QoS guarantees of other connections traversing the switch. If the connection is accepted then that switch reserves resources for it and allocates a VPI:VCI for the hop to that switch. The SETUP is then routed to the next switch along the path over its NNI on VPI:VCI 0:5 where the same procedure is repeated. Thus each switch in the connection path carries out call admission control checks.

When the SETUP reaches the egress switch 18 on the path, it is forwarded to the called party 12 over its UNI 20 on VPI:VCI 0:5. The called party 12, if it chooses to accept the call, replies with a CONNECT signalling message. This message is routed back along the connection path, the connection being completed at each switch as the CONNECT message passes back to the calling party 10. Once the CONNECT message is received at the calling party 10 it is acknowledged and the connection is complete.

In the present invention, a remote, off-board agent, the 'Proxy-Signalling Agent' or PSA, which is usually a PC or a workstation, provides signalling and call control functionality for one or more of the network elements. In order to receive and transmit signalling messages on behalf of a network element, a bidirectional VC is provisioned, one for each port, from the network element to the PSA. For each network element under the control of the PSA, the PSA provides signalling stacks, one for each of the element's ports, along with call admission control, routing and VCI allocation functions. This avoids the need for the network element to perform these functions.

The PSA controls the network element's connection tables using a simple and low-level control protocol to effect changes in the connection state at that element, rather than using UNI. As the network element does not need to provide signalling stacks, it can be a low cost, low complexity device. By making these devices as simple as possible, we can increase the overall reliability of the network.

The invention is defined in more detail in the appended claims to which reference should now be made.

Preferred embodiments of the invention will now be described with reference to the drawings in which.

In a preferred embodiment the network element(s) connected to a PSA comprise an Access Point (AP) 30 which connects a wired ATM network to a wireless network. When signalling messages are received by an AP 30 from within the wired network on a pre-assigned channel VPI:VCI 0:5, they are redirected to the PSA on a redirected signalling PVC 82. The PSA can configure an AP to perform this task automatically by modifying the contents of its VPI:VCI translation table so that the default signalling VPI:VCI is mapped to the VPI:VCI that corresponds to the redirected signalling PVC 80 which goes to the PSA. This channel must be the Provisioned Virtual Channel (PVC) on which the PSA expects to receive redirected signalling messages from a particular AP.

Figure 5:
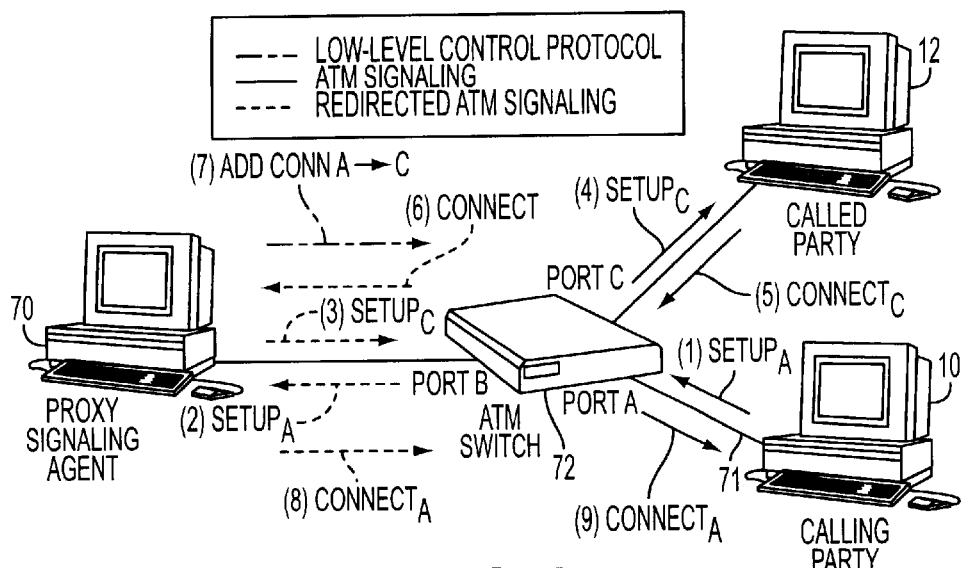
FIG. 5 shows the principal signalling message flows for connection set-up when employing a proxy signalling agent.
Figure 6:
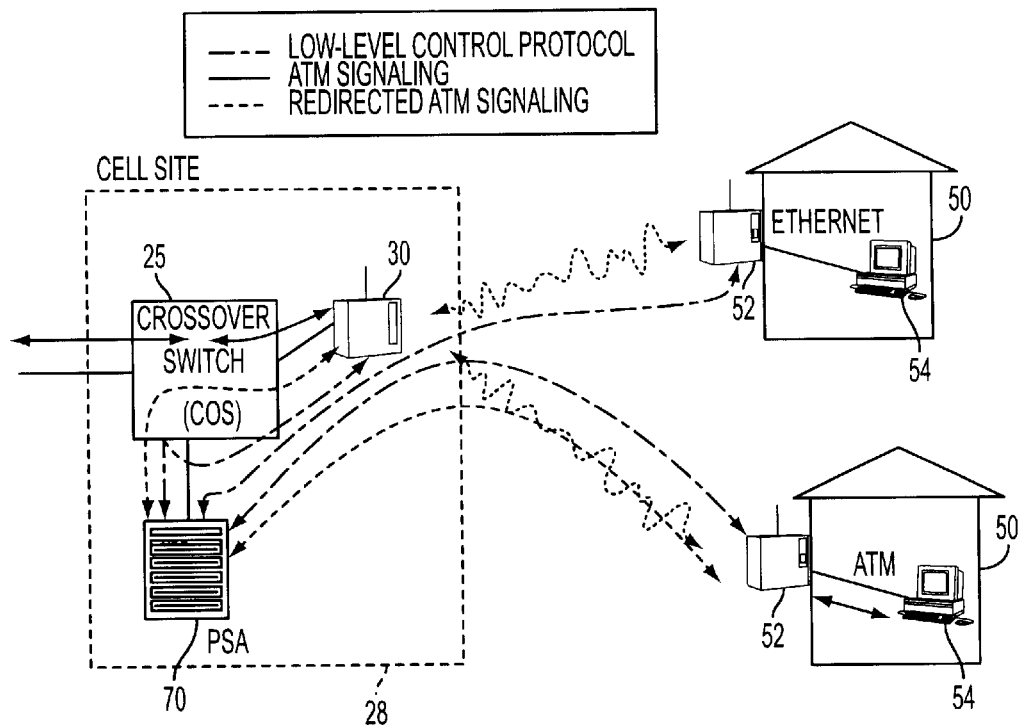
FIG. 6 shows the main components of a network according to one embodiment of the invention.

FIG. 5 shows the principal message flows for connection set-up when using a proxy-signalling agent. For ease of explanation the ATM network in this example comprises a single ATM switch 72. A first host 10, wishing to initiate a call to another host 12, sends a SETUP signalling message over its UNI 71 on VPI:VCI 0:5 to port A of the ATM switch 72. The SETUP message is redirected by the ATM switch 72 to the PSA 70, being outputted on port B on the channel on which the PSA receives redirected signalling messages. The PSA then performs call admission control to decide whether the resources required for the requested connection can be allocated without violating the QoS guarantees of other connections traversing the ATM switch 72. If the resources are available then the PSA reserves these and allocates a VPI:VCI for the hop from the calling party to the switch 72. The PSA then sends a SETUP message to port C of the switch. The SETUP is then forwarded to the called party 12 on its UNI on VPI:VCI 0:5

When the SETUP reaches the called party, it, if it chooses to accept the call, replies with a CONNECT signalling message. This message is routed back along the connection path to port C of the switch. The connection is completed as the CONNECT message passes back to the calling party 10 via the PSA. Once the CONNECT message is received at the calling party 10 it is acknowledged and the connection is complete.

When the PSA receives redirected signalling messages from an AP it decides whether it can allocate resources to the requested connection and so permit signalling to proceed. In order to make this decision the PSA determines whether the AP from which the redirected signalling message was received has sufficient resources to allow a new SVC to be set up. The PSA does this by looking in its management information file in which it maintains a record of all connections requested through each AP assigned to it.

In order to obtain the necessary information, a bi-directional AP management channel 80 is provisioned between the PSA and each AP under its control. This allows the PSA to access the VPI:VCI translation tables of each AP. The PSA can then control the AP's connection tables using a simple and low-level control protocol.

Figure 1:
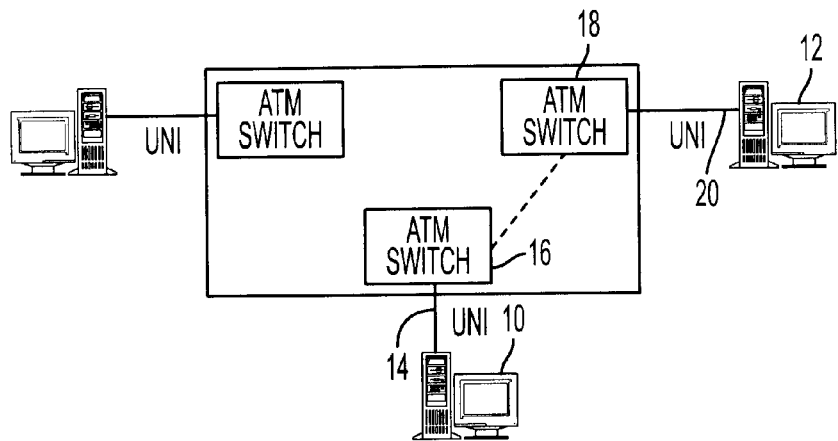
FIG. 1 shows the main components of a simplified wired ATM network.
Figure 2:
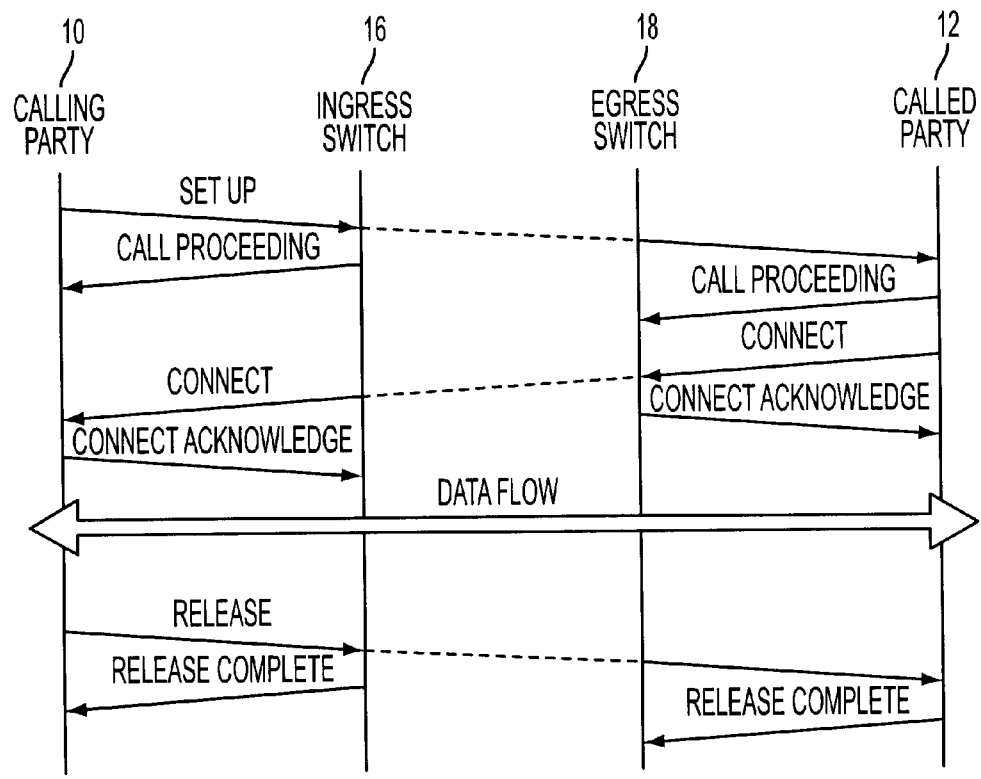
FIG. 2 shows the principal signalling message flows for UNI point-to-point ATM connection set-up in the network of FIG. 1.
Figure 3:
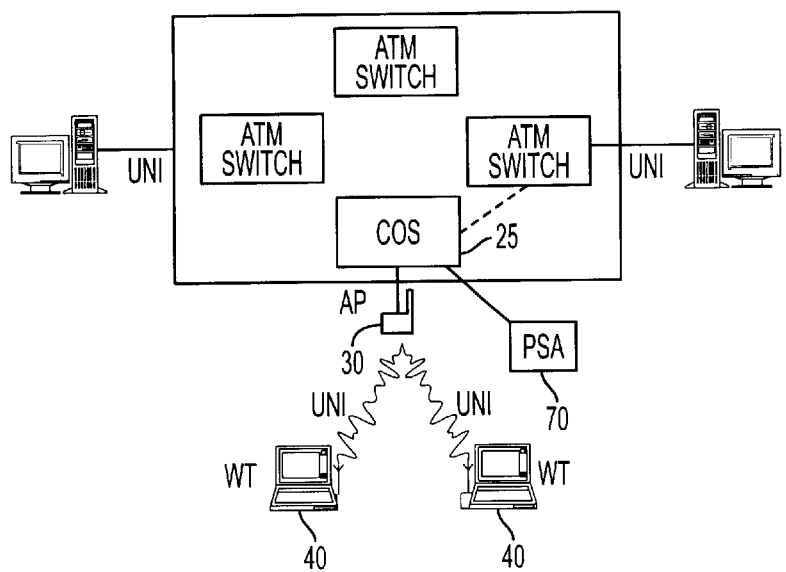
FIG. 3 shows the main components of a wireless ATM network according to one embodiment of the invention.

In one embodiment of the invention, the wireless ATM network is a wireless Local Area Network (LAN), an example of which is shown in FIG. 3. Wireless ATM LAN networks have been used in in-building systems employing micro- or Pico-cellular architectures. Access Points (APs) with a range of up to 30 m can be connected to a wired ATM infrastructure to provide wireless ATM connectivity to Wireless Terminals (WTs). Each AP 30 coordinates access to the radio channel for the WTs in its range which are registered with it. Research prototypes have demonstrated 25 Mbps wireless ATM where the bandwidth is shared between all WTs utilising a particular AP. The ATM physical layer is usually provided by a combination of DLC, MAC and RF PHY layers.

A CrossOver Switch (COS) 25 is used to provide support for handover between APs. The COS is connected to the PSA 70.

Applications on the WTs may be either native ATM applications utilising an ATM Application Programming Interface (API) such as WINSOCK2, or Transmission Control Protocol (TCP/IP) applications running over an Internet Protocol (IP) such as Classical IP ATM (RFC1577), LAN Emulation (LANE) or Multi Protocol Over ATM (MPOA).

Figure 4:
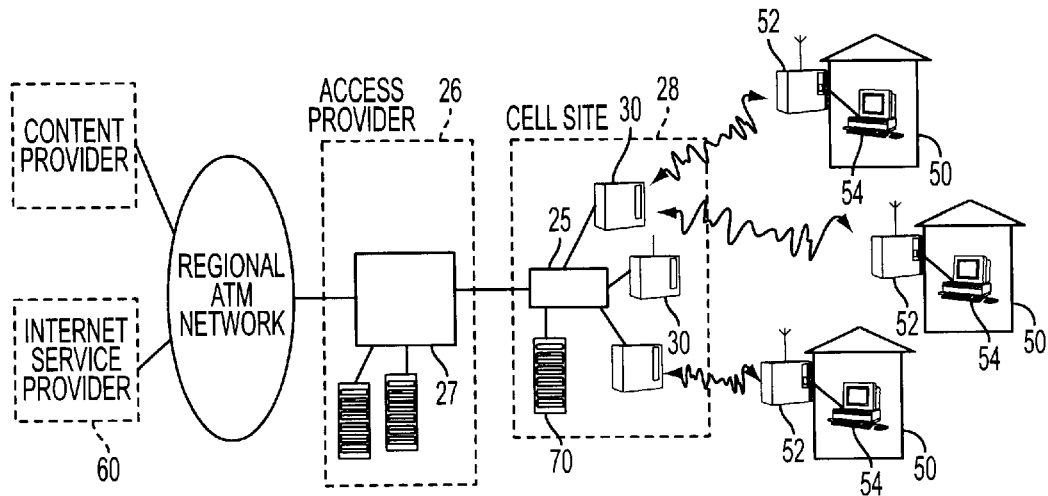
FIG. 4 shows the main components of a BWLL network according to an embodiment of the invention.

In another embodiment of the invention, the wireless ATM network is a Broadband Wireless Local Loop (BWLL), an example of which is shown in FIG. 4. In this system a wireless ATM system is used to provide the last hop from a network access provider 26 to a customer's premises 50 at a range of up to 10 km. ATM is used on the wireless link as well as providing the networking for the access provider 26. The access provider provides wireless connectivity to a particular geographical area via a cell site 28 which is a collection of APs 30, a cell site control server 29 and the PSA 70 which are connected to an ATM CrossOver Switch (COS) 25 which connects to an access provider's ATM access switch 27.

At the customer premises 50 a Subscriber Unit 52 (SU) provides access to the wireless local loop. It has two interfaces; one wireless ATM interface and one customer networking interface. However, in contrast to a native wireless ATM LAN, the networking interface provided to the customer may either be a native ATM interface supporting native end-to-end ATM or be Ethernet supporting IP traffic. As such, the customer premises 50 may contain one or more PCS 54 and where there are multiple PCS they will reside on an ATM or Ethernet LAN.

In order for the customer PCS 54 to utilise the service of say the customer's ISP 60, IP connectivity must be established with the ISP. IP models such a Classical IP over ATM, LANE, and MPOA target the campus and enterprise environment and lack the necessary security, session and auto-configuration functionality for remote access. A well-established model for connecting to ISPs is the Point-to-Point Protocol (PPP). PPP provides support for authentication, IP address assignment, encryption, compression, billing etc., along with the means to transport multi protocol datagrams including IP. Once a PPP session is established and authentication and IP address assignment has taken place, IP datagrams may be transmitted and received over the PPP link.

In prior art systems a PPP call is set up using a dial-up modem to connect to a modem at the ISP. In the present invention, a call can be set up without using modems. Recently, standards for using PPP over ATM have been defined in which an ATM SVC or ATM PVC is used to provide the PPP connection to the ISP, Once this connection has been made, a PPP session is established in the normal way.

Applications on the customer's PC 54 will typically be TCP/IP applications running over the Ethernet link or LAN. As PPP is used to connect a single host to an ISP, in the situation where there is more than one PC on an Ethernet LAN in the customer's premises 50, there will be a PPP session per host.

In both the wireless LAN and BWLL networks described above, an AP 30 can be viewed as a variable port switch. On the wired side, the AP 30 has one wired ATM interface 84 whilst on the wireless side, the AP has a number of logical wireless ATM interfaces 86, one for each WT 40 or SU 52 registered with that AP. The AP 30 can therefore be logically viewed as a fully-fledged ATM switch. As such the AP 30 needs to exhibit the full functionality of an ATM switch. The SU 52 in the BWLL scenario can be viewed as a two-port switch with a wired and wireless ATM interface.

By using the signalling mechanism of the present invention the PSA 70 provides full ATM signalling support for both the APs 30 and the SUs 52. No ATM signalling stacks need to be run in the COS switch, the APs or the SUs. These simply run the low-level control protocol used to manage the device's connection tables. Thus these devices can be low cost and low complexity.

By making these devices as simple as possible we can increase the overall reliability of the network. Furthermore, since all connection, signalling and address state is kept centrally, there is an opportunity to make this central controller, the PSA, very reliable. Reliability could be provided at a number of levels but would ultimately mean that if the central controller failed, then the system could failover to a backup system very quickly and efficiently without affecting the operation of the network. Compare this to the situation where you have state distributed among a number of relatively complex nodes. The problem of making the system reliable and robust to node failures is greatly increased.

Figure 7:
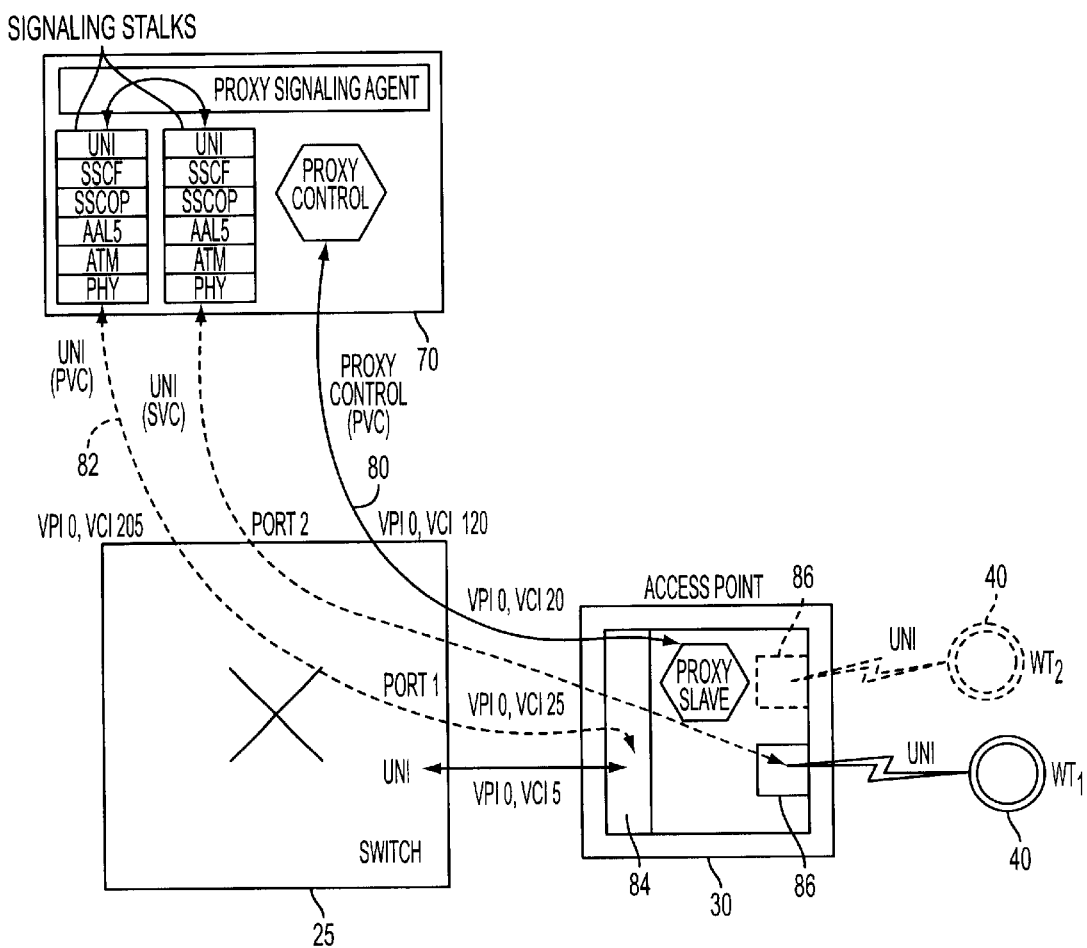
FIG. 7 shows the components of a Proxy Signalling Agent and an Access Point.

Referring to FIG. 7. When a wireless ATM/BWLL network is being installed, a number of access points are connected to the COS. For each AP two PVCs need to be established to the Proxy Signalling Agent through the COS. One PVC is created which redirects the UNI signalling connection between the COS and the AP to the remote UNI signalling stack running at the PSA.

In FIG. 7 it is assumed that the AP is connected to COS port 1 and PSA is connected to COS port 2. In more detail, a bidirectional VCI mapping is manually created at the AP which maps [AP wired port, VPI 0, VCI 5] to eg [AP wired port, VPI 0, VCI 25]. At the switch a bidirectional VCI mapping is manually created which maps [Port 1, VPI 0, VCI 25] to eg [Port 2, VPI 0, VCI 205]. At the PSA, the remote signalling stack for the AP wired port now runs on [VPI 0, VCI 205]. Thus any signalling messages sent to the AP on [Port 1, VPI 0, VCI 5] will be received at the PSA on [VPI 0, VCI 205] and any signalling messages sent by the PSA on [VPI 0, VCI 205] will be received by the COS on [port 1, VPI 0, VCI 5].

The other PVC is created to connect the Proxy Slave on the AP to the Proxy Control at the PSA. In more detail, a bidirectional VCI mapping is manually created at the switch which maps eg [Port 1, VPI 0, VCI 20] to [Port 2, VPI 0, VCI 120]. At the AP, the Proxy Slave runs over [VPI 0, VCI 20] and at the PSA the Proxy Control runs over [VPI 0, VCI 120].

For each SU, one (for Proxy Control) or two (including one for redirecting UNI, if the customer PC is an ATM PC) connections) need(s) to be established to the appropriate stacks at the PSA. For each WT, one redirected UNI connection needs to established from the WT to the PSA (as shown in FIG. 7).

To support wireless devices (WTs and SUs) which dynamically register and move between APs it is not acceptable to have to preprovisioned PVCs via a particular AP to the PSA for each wireless device which may use the AP. These connections are thus dynamically created as follows. When an SU, say, registers an AP, it is allocated a logical wireless port (say [wireless port 2]) at the AP and automatically has open a PVC for Proxy Control on [SU wireless port, VPI 0, VCI 20] and, if the customer PC is an ATM PC, a PVC for UNI signalling on [SU wireless port, VPI 0, VCI 5]. When the SU registers the PSA is informed by the AP of this event over the Proxy Control Channel.

The PSA then proceeds to create one (or two if ATM PC) connections to the AP. The PSA consequently issues a SETUP over its normal ATM signalling stack and interface towards the AP. When this SETUP arrives over the UNI connection between the COS and the AP, it is redirected back to the AP's remote signalling stack at the PSA. The PSA recognises this SETUP as being the one just issued and extracts the VPI, VCI (say VPI 0, VCI 33) allocated by the COS. It then creates a bidirectional VCI mapping at the AP from [AP wired port, VPI 0, VCI 33] to [AP wireless port 2, VPI 0, VCI 20]. The PSA returns a CONNECT over the APs redirected UNI signalling channel which completes the connection back to the PSA from where the original SETUP originated. Thus there is an SVC from the PSA to the AP which connects to the SU's proxy control PVC. Similarly, if the customer PC is an ATM PC, the same procedure is used to create an SVC from the PSA to the AP which connects to the SU's UNI PVC as shown if FIG. 7.

Figure 8:
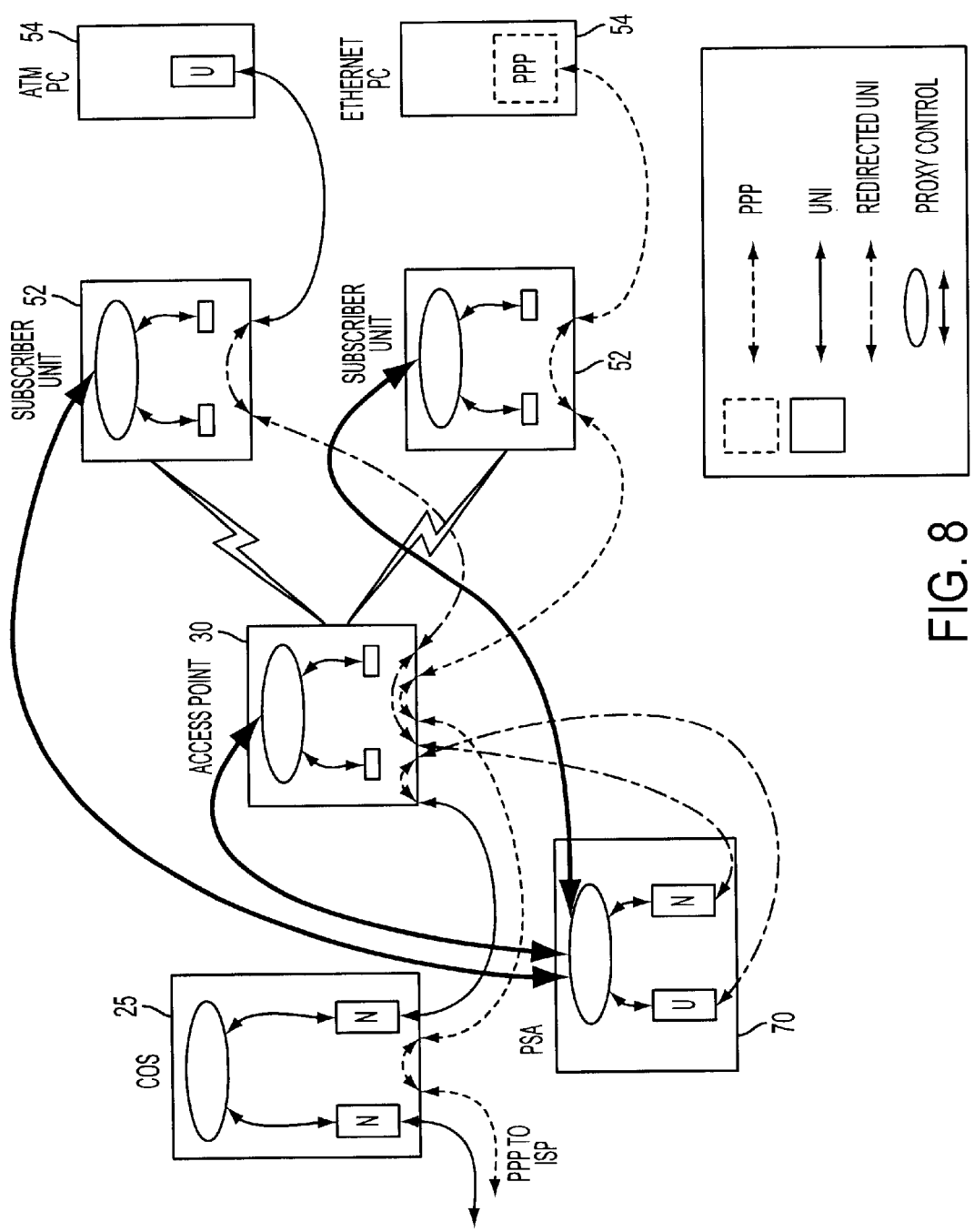
FIG. 8 shows the protocols used for signalling in the system of FIG. 6.

In FIG. 8, rectangular boxes inside the components of the network have been used to represent signalling stacks. Some of these have been marked 'N' to indicate that it is the network side of the signalling stack, 'U' to indicate the user side of a signalling stack, and 'PPP' to indicate a PPP connection. The oval shapes represent the functional elements of each component.

A significant advantage of the present invention can be seen when one considers the BWLL scenario, where each PC 54 at the customer's premises 50 has a PPP link to its ISP 60. By utilising the low-level control protocol to the Proxy Signalling Agent 70, an SU 52 can communicate the number of PCs 54 in the customer's LAN to the PSA 70 which will then, by proxy control, create PPP-over-ATM connections from the AP 30 at which the SU 52 is registered to the appropriate ISP 60. By only using the low-level control protocol to create the these connections at the AP 30 and particularly the SU 52, no ATM signalling messages cross the wireless link thereby saving wireless bandwidth.

If proxy signalling were used to provide signalling support just for the SU 52 at the customer premises 50 then signalling messages for the wireless link between the AP 30 and SU 52 would have to be forwarded, as normal, across the wireless link to the SU because the AP would regard it as having signalling capabilities, and then, because it has no signalling, they would have to be redirected back across the wireless link via the AP to the PSA. A signalling message would thus traverse the wireless link twice. Furthermore, the transport protocol SSCOP used to carry the signalling messages would also have to traverse the wireless link twice. By controlling the AP as well as the SU, no signalling messages are needed between the AP and SU for the wireless link and, also, no SSCOP protocol is used over the wireless link.

In the BWLL Ethernet scenario, where each PC at the customer's premises has a PPP link to its ISP, proxy signalling has the advantage that no SSCOP or ATM signalling messages travel over the wireless link and thus valuable wireless bandwidth is saved.

Another advantage of the invention is that the same low-level software may be used on the APs and SUs in the BWLL ATM case as in the BWLL Ethernet case. Without the use of proxy signalling, it would have to be decided in advance whether to put an ATM signalling stack for the SU's wired link depending on whether the PC was an Ethernet PC or an ATM PC. This would be more costly and be more difficult administratively.

What is claimed is:

1. A method of calling a mobile unit over a radio ATM network, comprising the steps of:
 i) receiving a call request to a first network element in the connection path from the calling party;
 ii) directing the call request to a proxy signalling agent coupled to the first or a second network element having at least one wired ATM interface and at least one wireless ATM interface;
 iii) performing call admission checks, routing, and virtual circuit identifier allocation for the first network element and addressing the call request to the called mobile unit to retrieve and transmit messages from said first network element, at the proxy signalling agent;

iv) forwarding the addressed call request to the network element which is coupled to the proxy signalling agent and which is in the connection path to said mobile unit;

v) transmitting the addressed call request to the mobile unit via radio; and vi) receiving the call request at the mobile unit.

2. A method according to claim 1 including the steps of:

determining at the mobile unit whether to accept the call and, transmitting an acceptance signal to the network element which is coupled to the proxy signalling agent and which is in the connection path from the mobile unit if the call is accepted.

3. A method of calling a mobile unit over a radio ATM network, comprising the steps of:

receiving a call request to a first network element in the connection path from the calling party;

directing the call request to a proxy signalling agent coupled to the first or a second network element having at least one wired ATM interface and at least one wireless ATM interface;

performing call admission checks, and addressing the call request to the called mobile unit, at the proxy signalling agent;

forwarding the addressed call request to the network element which is coupled to the proxy signalling agent and which is in the connection path to said mobile unit;

transmitting the addressed call request to the mobile unit via radio;

receiving the call request at the mobile unit;

determining at the mobile unit whether to accept the call and, transmitting an acceptance signal to the network element which is coupled to the proxy signalling agent and which is in the connection path from the mobile unit if the call is accepted;

directing the acceptance signal to the proxy signalling agent;

directing the acceptance signal from the proxy signalling agent to a network element coupled to it along with instructions for forwarding the acceptance signal; and forwarding the acceptance signal from the network element in accordance with the forwarding instructions.

4. A method of calling a party from a mobile unit over a radio ATM network comprising the steps of:

i) initiating a call by sending a radio call request from the mobile unit to an element of the ATM network having at least one wired ATM interface and at least one wireless ATM interface;

ii) directing the call request to a proxy signalling agent;

iii) performing call admission checks, routing, and virtual circuit identifier allocation for the first network element and addressing the call request to a second network element in the connection path to the called party to retrieve and transmit messages from said first signalling element, at the proxy signalling agent;

iv) forwarding the call request from the first network element to the addressed second network element; and v) transmitting the forwarded call request to the called party.

5. A method according to claim 4 including the steps of;

determining at the called party whether to accept the call and, transmitting an acceptance signal back down the connection path if the call is accepted.

6. A method of calling a party from a mobile unit over a radio ATM network comprising the steps of:

i) initiating a call by sending a radio call request from the mobile unit to an element of the ATM network having at least one wired ATM interface and at least one wireless ATM interface;

ii) directing the call request to a proxy signalling agent;

iii) performing call admission checks for the first network element and addressing the call request to a second network element in the connection path, at the proxy signalling agent;

iv) forwarding the call request from the first network element to the addressed second network element;

v) transmitting the forwarded call request to the called party;

vi) determining at the called party whether to accept the call and, transmitting an acceptance signal back down the connection path if the call is accepted;

vii) receiving the acceptance signal at the network element coupled to a proxy signaling agent and which is in one connection path to one called party;

viii) directing the acceptance signal to the proxy signally agent;

ix) the proxy signaling agent addressing the acceptance signal to the mobile unit which initiated the call;

x) directing the acceptance signal to a network element coupled to the proxy signalling agent and which is in the connection path to the mobile unit; and xi) transmitting the addressed acceptance signal from the network element via radio to the mobile unit.

7. A method according to any of claims 1 to 6 including the step of:

reserving resources for the requested connection at the proxy signalling agent if the call admission checks result in the connection being found to be admissible.

* * * * *